US010650137B2

(12) United States Patent
Anton

(10) Patent No.: US 10,650,137 B2
(45) Date of Patent: May 12, 2020

(54) METHOD, SERVER, FIREWALL, CONTROL DEVICE, AND SYSTEM FOR PROGRAMMING A CONTROL DEVICE OF A VEHICLE

(71) Applicant: Bayerische Motoren Werke Aktiengesellschaft, Munich (DE)

(72) Inventor: Markus Anton, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 192 days.

(21) Appl. No.: 15/853,041

(22) Filed: Dec. 22, 2017

(65) Prior Publication Data

US 2018/0137271 A1 May 17, 2018

Related U.S. Application Data

(63) Continuation of application No. PCT/EP2016/063001, filed on Jun. 8, 2016.

(30) Foreign Application Priority Data

Jun. 23, 2015 (DE) .................. 10 2015 211 540

(51) Int. Cl.
*G06F 21/76* (2013.01)
*G06F 21/52* (2013.01)
(Continued)

(52) U.S. Cl.
CPC ......... *G06F 21/52* (2013.01); *G05B 19/0426* (2013.01); *G06F 8/654* (2018.02);
(Continued)

(58) Field of Classification Search
CPC .......... G06F 21/12; G06F 21/76; G06F 21/85
See application file for complete search history.

(56) References Cited

U.S. PATENT DOCUMENTS 8,650,409 B1 * 2/2014 Reese .................... G06F 21/72
713/189
2006/0130033 A1 6/2006 Stoffels et al.
(Continued)

FOREIGN PATENT DOCUMENTS

DE         103 57 032 A1    1/2005
DE   10 2005 046 462 A1    3/2007
(Continued)

OTHER PUBLICATIONS

Idrees et al., "Secure Automotive On-Board Protocols: A Case of Over-the-Air Firmware Updates", pp. 1-14 (Year: 2011).*
(Continued)

*Primary Examiner* — Thaddeus J Plecha
(74) *Attorney, Agent, or Firm* — Crowell & Moring LLP

(57) ABSTRACT

The invention relates to a method for programming a control device of the vehicle, the method comprising: writing a first software module into the control device (106) via a first interface (108); blocking the first interface (108) of the control device (106); writing a key (122) into a secured memory area (132) of the control device (106) via a second interface; writing an encrypted vehicle software (112) into the control device (106) via the second interface; decrypting the encrypted vehicle software (112) by means of the first software module (110) by using the written key; storing the decrypted vehicle software in a memory area (134) of the control device (106); and installing read protection for the memory area (134) of the decrypted vehicle software.

16 Claims, 1 Drawing Sheet

(51) Int. Cl.

| | |
|---|---|
| *G06F 8/654* | (2018.01) |
| *G05B 19/042* | (2006.01) |
| *G06F 21/57* | (2013.01) |
| *G06F 21/85* | (2013.01) |
| *H04W 12/08* | (2009.01) |
| *H04L 29/06* | (2006.01) |
| *H04W 12/00* | (2009.01) |
| *G06F 21/12* | (2013.01) |

(52) U.S. Cl.
CPC ............ *G06F 21/12* (2013.01); *G06F 21/572* (2013.01); *G06F 21/76* (2013.01); *G06F 21/85* (2013.01); *H04L 63/02* (2013.01); *H04L 63/0227* (2013.01); *H04W 12/0023* (2019.01); *H04W 12/08* (2013.01); *G06F 2221/033* (2013.01)

(56) References Cited

U.S. PATENT DOCUMENTS

| | | | |
|---|---|---|---|
| 2007/0076882 A1 | 4/2007 | Engel et al. | |
| 2008/0027602 A1* | 1/2008 | Yeap | B60R 25/04 701/31.4 |
| 2011/0032506 A1* | 2/2011 | Koga | G03F 7/70525 355/77 |
| 2011/0138192 A1* | 6/2011 | Kocher | G06F 21/575 713/189 |
| 2012/0060039 A1 | 3/2012 | Leclercq | |
| 2013/0173899 A1* | 7/2013 | Geukes | G06F 21/575 713/2 |
| 2014/0250290 A1* | 9/2014 | Stahl | G06F 21/575 713/2 |
| 2016/0013934 A1* | 1/2016 | Smereka | G06F 21/572 713/171 |

FOREIGN PATENT DOCUMENTS

| | | |
|---|---|---|
| DE | 603 13 810 T2 | 1/2008 |
| DE | 10 2013 202 322 A1 | 5/2010 |
| DE | 10 2012 220 132 A1 | 5/2014 |
| WO | WO 2010/054920 A1 | 5/2010 |
| WO | WO 2011/121076 A1 | 10/2011 |

OTHER PUBLICATIONS

PCT/EP2016/063001, International Search Report dated Aug. 12, 2016 (Three (3) pages).

German Search Report issued in German counterpart application No. 10 2015 211 540.2 dated Jun. 6, 2016, with Statement of Relevancy (Fourteen (14) pages).

* cited by examiner

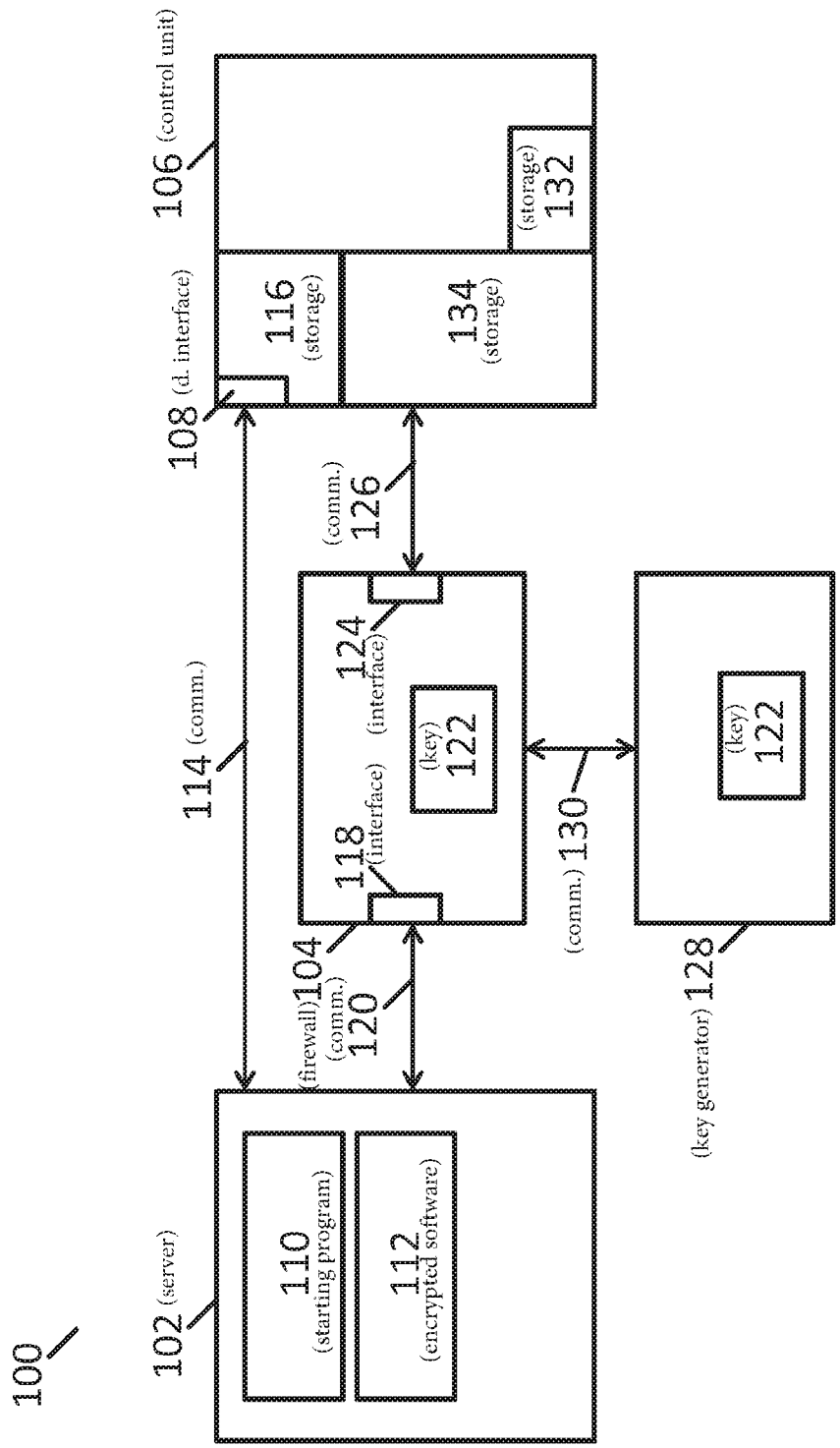

METHOD, SERVER, FIREWALL, CONTROL DEVICE, AND SYSTEM FOR PROGRAMMING A CONTROL DEVICE OF A VEHICLE

CROSS REFERENCE TO RELATED APPLICATIONS

This application is a continuation of PCT International Application No. PCT/EP2016/063001, filed Jun. 8, 2016, which claims priority under 35 U.S.C. § 119 from German Patent Application No. 10 2015 211 540.2, filed Jun. 23, 2015, the entire disclosures of which are herein expressly incorporated by reference.

BACKGROUND AND SUMMARY OF THE INVENTION

The invention relates to a method, a server, a firewall, a control unit and a system for programming a control unit of a vehicle.

Currently, vehicle software or vehicle software settings to be programmed are frequently transmitted unencrypted to the respective control units of a vehicle. Although the transmission channel can be encrypted for the transmission, the vehicle software is mostly present unencrypted on the computer of the transmitter and/or of the receiver. For example, the unencrypted vehicle software settings of computers of the manufacturer of a vehicle can be distributed to computers of repair workshops for servicing purposes. Thus, the vehicle software settings can be present unencrypted on the computers of repair workshops and/or the computers of the manufacturer of a vehicle. The unencrypted vehicle software settings can be disassembled, for example, to restore the original source code from the binary code of the vehicle software. By this means, the mode of action of control units and/or the security architecture of the software of vehicles can be analyzed. During a transmission of encrypted vehicle software settings it may be necessary that the key for decrypting the encrypted vehicle software setting is transmitted between the transmitter and the receiver, e.g. between a computer of the vehicle manufacturer and a computer of the repair workshop. If data thieves come into possession of the key on the computer of the transmitter and/or on the computer of the receiver together with the associated encrypted vehicle software settings, an unauthorized decryption by an untrustworthy third party may be possible.

It is an object of the invention to improve the security of the programming of control units of a vehicle. In particular, it is an object of the invention to improve the security in writing vehicle software settings and/or keys into a control unit.

The invention is distinguished by a method for programming a control unit of a vehicle. The method comprises the writing of a first software module via a first interface into the control unit. The method also comprises the blocking of the first interface of the control unit. After the blocking of the interface, a key is stored via a second interface in a secured storage area of the control unit and encrypted vehicle software is written via the second interface into the control unit. The encrypted vehicle software is decrypted by the first software module using the written key. The decrypted vehicle software is stored in a storage area of the control unit. Finally, a read protection for the storage area of the decrypted vehicle software is installed.

By blocking the first interface of the control unit, a read-out of the key and of the unencrypted vehicle software via the first interface can be prevented. Further the read-out of the unencrypted vehicle software via further interfaces of the control unit can be prevented by installing read protection. By this means, the security of the control unit can be increased. Furthermore, writing of the vehicle software or of the vehicle software setting can be encrypted so that an untrustworthy third party does not have the option to decrypt the encrypted vehicle software and/or to disassemble the content of the vehicle software.

According to an advantageous embodiment, the blocking of the first interface can comprise conveying a command for blocking the first interface of the control unit from the server to the control unit and executing the command for blocking the first interface on the control unit. By means of a command-controlled blocking of the first interface, the first interface, e.g. a diagnostic interface, of the control unit can be blocked in a simple manner. No further program and/or no further function is necessary for blocking the first interface. Furthermore, blocking can be carried out actively so that controlling the blocking can be activated from outside the control unit. By this means, control of the programming of the control unit can be simplified.

According to a further advantageous embodiment, the command for blocking the first interface can be conveyed from the server to a firewall and the command for blocking the first interface can be conveyed from the firewall via the second interface of the control unit to the control unit. By conveying the command for blocking the interface via a firewall, controlling of the blocking of the first interface of the control unit can be improved. By using a firewall, it can be restricted which unit or which computer may transmit the command for blocking the first interface. For example, rules in the firewall can specify which computer may convey the command to the firewall. Thus, the blocking of the first interface can be monitored and controlled efficiently. The command for blocking the first interface can thus take place via a secured interface between the firewall and the control unit which further increases the security of the programming of the control unit.

According to a further advantageous embodiment, the method can comprise conveying a command for writing a key from the server to the firewall and executing the command for writing the key in the firewall. Executing the command for writing the key in the firewall can also comprise blocking the interface between the firewall and the server, reading the key out of a memory of the firewall, conveying the key via the second interface of the control unit from the firewall to the control unit and releasing the interface between the firewall and the server. By this means, the security in writing the key from the firewall into the control unit can be increased. By blocking the interface between the firewall and the server, possible attacks by the server on the firewall in order to read the key out of the firewall, for example, can be prevented.

According to a further advantageous embodiment, the conveying of the key can comprise conveying an inquiry to the control unit as to whether the first interface is blocked and receiving a response of the control unit as to whether the first interface is blocked. The key can be conveyed via the second interface of the control unit when the response comprises a confirmation that the first interface of the control unit is blocked. This makes it possible to ensure that the control unit is in a state which prevents the read-out or change of the key from the control unit via the first interface of the control unit. The security in writing the key can thus be increased.

According to a further advantageous embodiment, the method can comprise conveying the encrypted vehicle software from the server to the firewall, blocking the interface between the firewall and the server and conveying the encrypted vehicle software from the firewall to the control unit. Advantageously, the encrypted vehicle software can be transmitted from the firewall to the control unit only when the interface between the server and the firewall is blocked. By this means, the security of the method can be increased further. The distribution of the encrypted vehicle software can take place independently of the distribution of the key. The firewall ensures that there is no transmission of the key from the server to the firewall. It is only the encrypted vehicle software which has to be transmitted from the server to the firewall.

The invention is also distinguished by a server for programming a control unit, the server being designed for receiving a first software module, receiving encrypted vehicle software, conveying the first software module via a first interface to a control unit, conveying a command for blocking the first interface to the control unit, conveying the encrypted vehicle software to the firewall and conveying a command for writing a key to the firewall.

The invention is also distinguished by a firewall for programming a control unit, the firewall being designed for receiving a command for blocking a first interface of a control unit, forwarding the command for blocking the first interface to the control unit, receiving encrypted vehicle software, receiving a command for writing a key into the control unit, writing the key via a second interface into a secured storage area of the control unit and conveying the encrypted vehicle software via the second interface to the control unit.

The invention is also distinguished by a control unit, the control unit comprising a first interface which is designed to receive a first software module. The control unit also comprises a first storage element which is designed to store the first software module, a second storage element which is designed to store unencrypted vehicle software, and a third storage element which is designed to store a key. Within the context of the present document, the first, second and/or third storage element can be storage areas of one or more nonvolatile memories or storage elements of a control unit. The control unit also comprises a processor and instructions for execution on the processor which, when executed on the processor, execute the above-described method.

The invention is also distinguished by a system for programming a control unit, the system comprising a server described above, a firewall described above and a control unit described above.

Further features of the invention are gained from the claims, the figures and the description of the FIGURES. All features and combinations of features mentioned above in the description and the features and combinations of features mentioned in the text which follows in the description of the figures and/or shown in the FIGURES alone can be used not only in the combination specified in each case but also in other combinations or by themselves.

The invention is based on the considerations explained in the text which follows:

Vehicle software settings will be encrypted as soon as they are generated. The encryption can take place, for example, by familiar symmetric or asymmetric encryption methods. The encrypted vehicle software settings can be transmitted or conveyed in encrypted form on a production server of a vehicle manufacturer and/or to servers of repair workshops. In the case of a production of a control unit, the production server only programs a boot loader or a starting program, respectively, into the control unit. The programming can take place, for example, via a diagnostic interface or a debugging interface, respectively. The programming can preferably take place via the standardized diagnostic interface, e.g. the standardized diagnostic interface of the Joint Test Action Group JTAG. Preferably, the production server can program the starting program directly into the control unit.

The starting program or the boot loader, respectively, generally does not contain any secret or critical data. The diagnostic interface can be closed accordingly. The production server can then no longer communicate directly with the control unit to be programmed but only with a firewall. The firewall can receive the encrypted data to be programmed, e.g. encrypted vehicle software settings. After receiving the encrypted data to be programmed, the interface between the production computer and the firewall can be closed. The key for decrypting the encrypted data to be programmed is preferably not present or stored on the production server but only in the firewall. The firewall is configured to be read-protected towards the outside, i.e. with respect to the interface towards the production server. The read-protected firewall can communicate with the control unit to be programmed via a protected interface. The firewall can initially transmit a secret decryption key into the control unit to be programmed. Following this, the vehicle software to be programmed can be transmitted to the control unit. The decryption of the encrypted vehicle software can be carried out by the control unit itself. By installing a read protection on the control unit, the vehicle software no longer encrypted can be protected against unauthorized access by third parties.

Vehicle software settings can thus no longer be disassembled. An analysis of the vehicle software by third parties is thus no longer possible. The unauthorized access to control and/or security code in the vehicle can thus be excluded, since the encrypted vehicle software and the associated key never occur together from a computer or server. Due to the firewall between the production server and the control unit in a production plant, spying out of the decryption keys can also be prevented.

In the text which follows, a preferred exemplary embodiment of the invention is described by means of the attached drawings. From this, further details, preferred embodiments and further developments of the invention are obtained.

Other objects, advantages and novel features of the present invention will become apparent from the following detailed description of one or more preferred embodiments when considered in conjunction with the accompanying drawings.

BRIEF DESCRIPTION OF THE DRAWINGS

In detail, FIG. 1 schematically shows a system for programming a control unit.

DETAILED DESCRIPTION OF THE DRAWINGS

FIG. 1 shows an overview of a system 100 for programming a control unit of a vehicle. The system comprises a server 102, a firewall 104 and/or a control unit 106. The control unit 106 can be, for example, a central control unit, an engine control unit, a control unit for gear locking, a control unit for an immobilizer, a control unit for steering column locking, a control unit of an antenna module and/or a remote access control unit. The firewall 104 can be a computer, a server, a network component and/or a control unit which can be arranged inside the vehicle or outside the vehicle.

The server 102 can be a production server. The server 102 can be a computer or a server of a repair workshop. The server 102 can be arranged inside or outside a vehicle. The server 102 is preferably arranged outside the vehicle. The server 102 can be accessed via a public network, e.g. the Internet, and/or via a local network. The server 102 can communicate with the control unit via a diagnostic interface 108. For example, the diagnostic interface can be a JTAG interface, i.e. an interface which has been specified by the Joint Test Action Group (JTAG). For example, the diagnostic interface can be an interface according to the IEEE standard 1149.1. The server 102 can also communicate with a firewall. The communication with the firewall can take place preferably via a serial interface between the server 102 and the firewall 104. Alternatively, any other network interface, e.g. Ethernet or bus-based network interfaces, can also be used.

The server 102 can store a first software module, e.g. a starting program 110 or a boot loader of the control unit 106. The server can also store encrypted vehicle software 112 or an encrypted vehicle software setting. The starting program 110 can be transmitted 114 from the server 102 to the diagnostic interface 108 of the control unit 106. In the case of a successful or, respectively, unsuccessful transmission, the control unit 106 can convey or transmit a corresponding confirmation to the server. If the transmission of the starting program 110 is not successful, the server 102 can carry out another transmission. The control unit 106 can store the starting program 110 in a storage area 116 of the control unit 106 provided for this purpose.

The server 102 can also communicate 120 with an interface 118 of the firewall 104. Via the interface 118 of the firewall, the server can convey commands to the firewall and/or transmit the encrypted vehicle software 112. In detail, the server 102 can transmit a command for blocking the diagnostic interface 108 of the control unit 106 to the firewall. Furthermore, the server can convey a command for writing a key 122 to the firewall. However, the server 102 cannot read any data from the firewall. In particular, the server 102 cannot read the key 122 of the firewall. The writing of data and/or the conveying of commands to the firewall can be permitted to the server 102 by the firewall 104, however. The server 102 can receive a confirmation of the respective action from the firewall. For example, the server 102 can receive a corresponding confirmation in the case of successful execution of a command by the firewall 104.

The firewall 104 can receive data and/or commands from the server 102 via the interface 118. The firewall 104 can also convey 126 commands and/or data to another interface of the control unit 106 via the interface 124. The firewall 104 can store a key 122. With the aid of the key 122, the encrypted vehicle software 112 can be decrypted. The key 122 can be generated in a key generator 128. After its generation, the key 122 can be transmitted 130 to the firewall 104 or received from the firewall 104. The firewall 104 can store the key 122. The firewall can preferably store the key in a protected storage area out of which the server 102 cannot read the key.

The firewall 104 can receive a command for blocking the diagnostic interface 108 via the interface 118 from the server 102. The firewall 104 can forward the command to the control unit 106 for blocking the diagnostic interface 108. The command can preferably be conveyed via the further interface of the control unit 106 from the firewall 104.

The firewall 104 can also receive encrypted vehicle software 112 from the server 102 via the interface 118. This encrypted vehicle software can be forwarded from the firewall 104 to the control unit 106.

The firewall 104 can receive a command for writing a key into the control unit via the interface 118. The command can contain, for example, one or more identification numbers which specify for which control unit the key is to be programmed. For example, the command can contain a chassis number of the vehicle and/or an identification number of the control unit. The firewall can identify the associated key by means of the command for writing a key. The firewall 104 can block the interface 118 with the server 102 in order to prevent a read-out of the key 122 via the interface 118. For example, the interface 118 can be blocked after receiving the command for writing the key.

When the firewall 104 has identified the key 122 which is to be written into the control unit 106, the firewall 104 can read the key 122 out of the memory of the firewall 104. The firewall can subsequently transmit the key 112 via the interface 124 to the control unit. The key can be transmitted encrypted. After the key has been transmitted to the control unit 106, the interface 118 can be released by the firewall 104 so that the server 102 can transmit commands and/or encrypted vehicle software to the firewall 104.

Additionally or alternatively the firewall 104 can check whether the key is intended for the control unit 106. For this purpose, the firewall 104 can convey an inquiry for conveying an identification or identification number to the control unit 106. The identification number of the control unit 106 can be compared with an identification number which is linked to the key. If the identification number of the control unit matches the identification number of the key, the key can be transmitted by the firewall 104. By this means, the security can be increased further in the transmission of the key to the control unit 106.

Before the transmission of the key, the firewall 104 can convey an inquiry to the control unit as to whether the diagnostic interface is blocked. The firewall can receive a response to this inquiry from the control unit via the interface 124. The firewall 104 can only transmit the key to the control unit 106 when the control unit reports in response that the diagnostic interface 108 of the control unit is blocked. Sending the inquiry and evaluating the response prevents the server 102 from being able to read the key 122 out of the secured storage area 132 of the control unit 106 via the diagnostic interface 108.

The control unit 106 can comprise a storage area 116 for storing a starting program. The storage area 116 can be written to and/or read via the interface 108 by the server 102. The control unit can also comprise a storage area 134 for storing the vehicle software or vehicle software setting and/or a storage area 132 for storing one or more keys. The storage areas 134 and/or 132 can be written to and/or read via a further interface of the control unit. The storage area 132 for storing a key is preferably a protected storage area, e.g. a so-called Secure Element. For the storage area 134, a read protection can be installed which prevents reading or a read-out of the unencrypted vehicle software. For example, the rights for access to the storage area 134 can be set in such a way that reading of the storage area 134 via the interfaces of the control unit 106 is no longer possible.

The control unit can also receive a software module 110, e.g. a starting program, via the interface 108. The software module 110 can be stored in the storage area 116. The control unit 106 can receive a command for blocking the interface 108 via the further interface. Preferably, the control unit 106 can receive the command for blocking the interface 108 from the firewall 104. The control unit 106 can execute the command for blocking the interface 108. By executing the command for blocking the interface 108, the control unit can block the interface 108 so that no access to the storage area 116 and/or the storage areas 132 and 134 is possible via interface 108. In particular, registers of the storage area 116 and/or of the storage areas 132 and 134 can no longer be read via the interface 108 for diagnostic purposes. In detail, the command for blocking the interface 108 can execute a program in the starting program of the control unit 106 which blocks the interface 108 of the control unit. By blocking the interface, it is possible to prevent the key and/or the unencrypted vehicle software from being able to be read out of the memory of the control unit 106.

Furthermore, the control unit can receive an inquiry as to whether the interface 108 is blocked. The inquiry can be received by a firewall 104 from the control unit 106. The control unit can check whether the interface 108 is blocked and accordingly respond to the inquiry of the firewall 104. If the check as to whether the interface 108 is blocked is successful, the control unit can receive one or more keys from the firewall 104. The control unit 106 can store the key or keys in the storage area 132.

Additionally or alternatively, the control unit 106 can receive an inquiry for conveying the identification number of the control unit 106. The inquiry for conveying the identification number of the control unit 106 can be received by the control unit 106 from the firewall 104. In response to the inquiry for conveying the identification number of the control unit 106, the control unit 106 can convey the identification number to the firewall 104. Following the inquiry for conveying the identification number, the control unit 106 can receive and/or store one or more keys as described above.

The control unit 106 can receive encrypted vehicle software or an encrypted vehicle software setting via the further interface. The starting program can program the received encrypted vehicle software. For this purpose, the starting program can read the key out of the storage area 132 and decrypt the encrypted vehicle software 112. Following this, the starting program can store the decrypted vehicle software in the storage area 134. After storing has taken place, the control unit 106 can send a confirmation of the programming of the vehicle software to the firewall 104.

After the programming of the vehicle software, the control unit 106 can receive a read protection. The read protection can be, for example, a command by means of which the access rights to the storage area 134 can be set. The access rights can in this case be set in such a way that reading of the storage area 134 via an interface of the control unit 106 is prevented. Additionally or alternatively, the control unit 106 can install a read protection. For example, the read protection can be a software module which blocks the access to the storage area 134.

LIST OF REFERENCE DESIGNATIONS 100 system
102 server
104 firewall
106 control unit
108 diagnostic interface
110 starting program
112 encrypted vehicle software
114 conveying a starting program
116 storage area for storing a starting program
118 interface of the firewall with the server
120 communication between server and firewall
122 key
124 interface of the firewall with the control unit
126 communication between the firewall and the control unit
128 key generator
130 communication between key generator and firewall
132 storage area of a control unit for storing keys
134 storage area for storing vehicle software The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for programming a control unit of a vehicle, the method comprising:
    writing a first software module via a first interface into the control unit;
    blocking the first interface of the control unit;
    writing a key via a second interface into a secured storage area of the control unit;
    writing encrypted vehicle software via the second interface into the control unit;
    decrypting the encrypted vehicle software by the first software module using the written key;
    storing the decrypted vehicle software in a storage area of the control unit; and
    installing a read protection for the storage area of the decrypted vehicle software.

2. The method as claimed in claim 1, wherein the blocking of the first interface comprises:
    conveying a command for blocking the first interface of the control unit from a server to the control unit; and
    executing the command for blocking the first interface on the control unit.

3. The method as claimed in claim 2,
    wherein the command for blocking the first interface is conveyed from the server to a firewall, and
    wherein the command for blocking the first interface is conveyed from the firewall via the second interface of the control unit to the control unit.

4. The method as claimed in claim 1, the method furthermore comprising:
    conveying a command for writing the key from a server to a firewall; and
    executing the command for writing the key in the firewall, comprising:
        blocking an interface between the firewall and the server;
        reading the key out of a memory of the firewall;
        conveying the key via the second interface of the control unit from the firewall to the control unit; and
        releasing the interface between the firewall and the server.

5. The method as claimed in claim 2, the method furthermore comprising:
    conveying a command for writing the key from the server to a firewall; and executing the command for writing the key in the firewall, comprising:
blocking an interface between the firewall and the server;
reading the key out of a memory of the firewall;
conveying the key via the second interface of the control unit from the firewall to the control unit; and
releasing the interface between the firewall and the server.

6. The method as claimed in claim 4, wherein the conveying of the key further comprises:
conveying an inquiry to the control unit as to whether the first interface is blocked; and
receiving a response of the control unit as to whether the first interface is blocked,
wherein the key is conveyed via the second interface of the control unit when the response comprises a confirmation that the first interface of the control unit is blocked.

7. The method as claimed in claim 5, wherein the conveying of the key further comprises:
conveying an inquiry to the control unit as to whether the first interface is blocked; and
receiving a response of the control unit as to whether the first interface is blocked,
wherein the key is conveyed via the second interface of the control unit when the response comprises a confirmation that the first interface of the control unit is blocked.

8. The method as claimed in claim 1, the method also comprising:
conveying the encrypted vehicle software from a server to a firewall;
blocking an interface between the firewall and the server; and
conveying the encrypted vehicle software from the firewall to the control unit.

9. The method as claimed in claim 4, the method also comprising:
conveying the encrypted vehicle software from the server to the firewall;
blocking the interface between the firewall and the server; and
conveying the encrypted vehicle software from the firewall to the control unit.

10. The method as claimed in claim 6, the method also comprising:
conveying the encrypted vehicle software from the server to the firewall;
blocking the interface between the firewall and the server; and
conveying the encrypted vehicle software from the firewall to the control unit.

11. A server, including: a hardware processor, a memory and instructions stored on the memory, which when executed by the processor configures the server to execute a method for programming a control unit, the method comprising:
receiving a first software module;
receiving encrypted vehicle software;
conveying the first software module via a first interface to the control unit;
conveying a command for blocking the first interface to the control unit;
conveying the encrypted vehicle software to a firewall; and
conveying a command for writing a key to the firewall.

12. A control unit, the control unit comprising:
a first interface configured to receive a first software module;
a first storage element configured to store the first software module;
a second storage element configured to store decrypted vehicle software;
a third storage element configured to store a key; and
a hardware processor, comprising instructions which, when executed on the processor causes the control unit to:
write the first software module via the first interface into the control unit;
block the first interface of the control unit;
write the key via a second interface into the third storage element of the control unit;
write encrypted vehicle software via the second interface into the control unit;
decrypt the encrypted vehicle software by the first software module using the written key;
store the decrypted vehicle software in the second storage element of the control unit; and
install a read protection for the second storage element of the decrypted vehicle software.

13. The control unit as claimed in claim 12, wherein the processor is to cause the control unit to block the first interface by:
conveying a command for blocking the first interface of the control unit from a server to the control unit, and
executing the command for blocking the first interface on the control unit.

14. The control unit as claimed in claim 13,
wherein the command for blocking the first interface is conveyed from a server to a firewall, and
wherein the command for blocking the first interface is conveyed from the firewall via the second interface of the control unit to the control unit.

15. The control unit as claimed in claim 12, wherein the processor is to further cause the control unit to:
convey a command for writing the key from a server to a firewall; and
execute the command for writing the key in the firewall, comprising:
block an interface between the firewall and the server;
read the key out of a memory of the firewall;
convey the key via the second interface of the control unit from the firewall to the control unit; and
release the interface between the firewall and the server.

16. The control unit as claimed in claim 12, wherein the processor is to further cause the control unit to:
convey the encrypted vehicle software from a server to a firewall;
block an interface between the firewall and the server; and
convey the encrypted vehicle software from the firewall to the control unit.

* * * * *